United States Patent [19]

Kogler et al.

[11] 3,758,702
[45] Sept. 11, 1973

[54] INSULATED BUS-BAR ASSEMBLY HAVING A BRANCH CONNECTION

[75] Inventors: Werner Kogler; Werner Kohler; Aly Abou-Zied, all of Berlin, Germany

[73] Assignee: Siemens Aktiengesellschaft, Munich, Germany

[22] Filed: May 18, 1972

[21] Appl. No.: 254,737

[30] Foreign Application Priority Data
May 21, 1971   Germany.................... P 21 26 094.6

[52] U.S. Cl............................. 174/71 B, 339/116 R
[51] Int. Cl.............................................. H02g 5/00
[58] Field of Search............. 174/68 B, 71 R, 71 B, 174/72 R, 72 B, 88 B; 317/103; 339/22 B, 116 R, 263 R, 272 R

[56] References Cited
UNITED STATES PATENTS 3,178,668   4/1965   Weimer et al................. 174/88 B X
3,577,114   5/1971   Hawkins........................ 174/72 R X
3,633,147   1/1972   Polidori....................... 174/72 R UX

FOREIGN PATENTS OR APPLICATIONS 702,117      1/1965   Canada........................... 174/72 B
1,490,298   10/1969   Germany.......................... 174/71 B Primary Examiner—Laramie E. Askin
Attorney—Hugh A. Chapin

[57] ABSTRACT

An insulated bus-bar for high-voltage switching installations is equipped with a conductor member of rectangular cross-section having wide and narrow sides. The conductor member is enclosed by a layer of insulating material in which is formed a recess down to the conductor member at a wide side thereof. A branch conductor extends into the recess and presses tightly against the conductor member.

12 Claims, 1 Drawing Figure

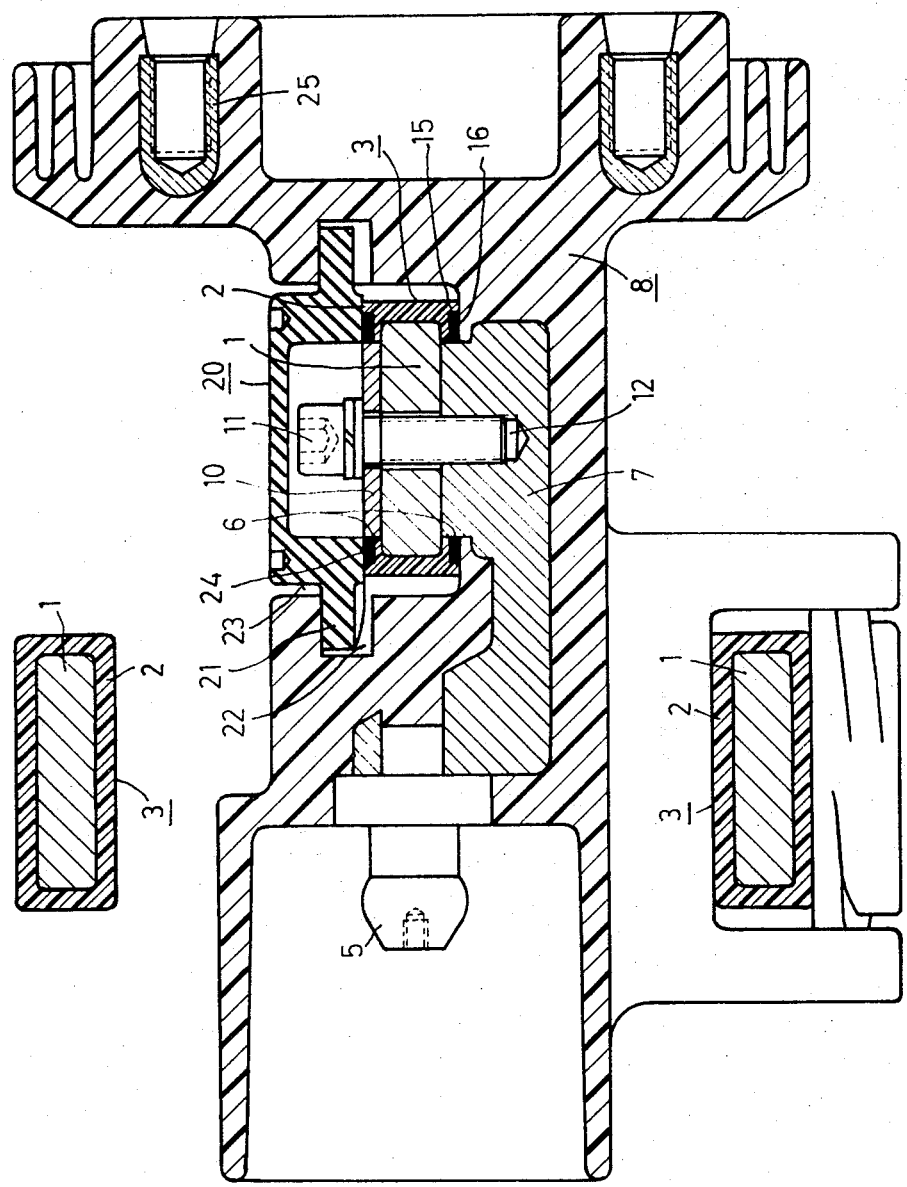

INSULATED BUS-BAR ASSEMBLY HAVING A BRANCH CONNECTION

BACKGROUND OF THE INVENTION

1. Field of the Invention

The invention relates to an insulated bus-bar for high-voltage switching installations in which a conductor of rectangular cross-section carries a closed layer of insulation except at a connecting area.

2. Description of the Prior Art

Previously in such arrangements, the conductor was left completely exposed at the connecting area. Specifically, the insulation which consisted, for example, of polyvinyl chloride tubing, extended only to the area of the connecting point and was basically only a means for preventing arcs from running along the bus-bar conductor. Dielectrically, insulation of this kind did not provide any advantage.

In Elektrotechnische Zeitschrift, Ausgabe B, Vol. 13, No. 7, of April 3, 1961 (p. 170, FIG. 11), an insulated bus-bar for high-voltage switching installations is shown, in which a circular bus-bar conductor is secured in position by means of special connecting pieces encased within casting resin. At the connecting or attachment points, the conductor, stripped of insulation on its entire circumference, is pressed against specially shaped connecting pieces. These connecting pieces are accommodated in box-like projections of the casting-resin insulation of the connecting pieces and are covered by covers of insulating material having a large area. In this configuration of the connection point, long, narrow gaps invariably occur in which dielectrically unfavorable conditions prevail.

SUMMARY OF THE INVENTION

It is an object of the invention to provide connections that have superior dielectric characteristics. Subsidiary to this object, it is an object of the invention to provide an insulated bus-bar having an electrical connection that is dielectrically superior.

In the insulated bus-bar assembly of the invention, rectangular conductors are used for the bus-bars, having, in the suitable configuration, greater mechanical strength with respect to current forces.

According to the invention, a preferably circular recess is formed in the insulating layer at the connection location. The recess is provided on the wide side of the conductor and a branch-circuit conductor is pressed against the conductor in butt fashion, through this recess.

With the invention, no specially-shaped parts are needed for the electrical connection, as the wide side of the flat conductor of the bus bar can be pressed in butt fashion against ordinary plane contact surfaces. At the same time, the junction or connections can be encapsulated almost entirely without gaps by parts made of insulating material.

According to a further feature of the invention, it is advantageous to provide corresponding recesses on the wide sides of the conductor having a rectangular cross-section. One of the recesses can be covered with insulating material after the fastening means are installed, while the other recess is covered by the branch conductor and/or its insulation. The insulating-material cover can be securely pressed on by inclined surface means in the form, for example, of wedge-like projections extending from the cover of insulating material. The inclined surface means could be a winding formed on the periphery of a cylindrical cover so as to make the cover threadably engageable.

As is well known, one can improve the dielectric strength, by attaching the branch conductor at the junction with a covering of insulating material, which can advantageously serve as a holding means to fasten the cover. Insulation of very high dielectric quality can be obtained in this connection by seals of rubber-elastic material, pressed together between the insulating layer and the cover and/or the covering of insulating material. The insulating-material covering, which serves in a known manner to support the bus-bar, can furthermore be connected with the bus-bar in a force-locking manner by only the cover, so that an easy-to-install arrangement results.

Although the invention is illustrated and described herein as an insulated bus-bar, it is nevertheless not intended to be limited to the details shown, since various modifications may be made therein within the scope and the range of the claims. The invention, however, together with additional objects and advantages will be best understood from the following description and in connection with the accompanying drawing.

BRIEF DESCRIPTION OF THE DRAWING

The drawing illustrates, in section, an insulated bus-bar equipped with a connection as required by the invention. A three-phase bus-bar system is shown which, for example, can be used in conjunction with a metal-clad, high-voltage 20 KV switching installation. Details of the encapsulation and the additional elements of the electrical installation such as power circuit breakers, transformers, cable connectors, etc. are omitted for clarity.

DESCRIPTION OF THE PREFERRED EMBODIMENTS

Referring now to the drawing, the bus-bar system comprises three identical copper conductors 1 of rectangular cross-section, for instance, 20 × 60 mm. The conductors 1 are covered with a uniform insulating layer 2 that can consist of casting resin or a similar plastic material. The three bus-bars 3 are arranged at the respective corners of an imaginary triangle.

The bus-bars 3 are connected by insulated branch conductors 7 to three stationary disconnect switching parts 5, the latter being arranged in alignment parallel to the bus-bars 3. A movable power circuit breaker, not shown, can be connected with its movable disconnect switching contacts to the switching contacts 5. The branch conductor 7 is shown for the center bus-bar in the drawing, so that the connecting location can be seen in detail.

At the connecting location, the insulating layer 2 of the conductor member 1 is provided with recess means in the form of a cylindrical recess 6 on both its wide sides. The recesses 6, for example, can be mutually aligned. The branch conductor 7 is fitted to and grips into one recess 6. The conductor 7 is inserted into a body 8 made of casting resin.

On the side opposite the branching conductor 7, a plate 10 is placed in the recess 6. The plate 10 is pressed against the conductor 1 by fastening means comprising a screw 11 that engages the threaded hole 12 in the branch conductor 7, so that a clamping pressure sufficient for current flow can be applied. The recess 6 of the bus-bar insulation 2 in the region of the branch conductor 7 is covered so as to be protected from contact by the body 8 of insulating material in the form of casting resin which surrounds the branch conductor 7. Additionally, a high dielectric insulation is provided between the casting resin 8 and the conductor insulation 2 by the seal 15 placed in the gap 16.

The upper recess 6, which is provided for the attachment of the conductor 1 to the branch conductor 7 is closed with a cover 20 made of insulating material. The cover 20 is provided with inclined surface means in the form of wedge-shaped lateral projections 21, which are pressed into receiving means in the form of recesses 22 of the body 8 in the manner of a bayonet connection. The body 8 can thus constitute a holding means for securely holding the cover 20 over the recess 6. In lieu of the bayonet connection, the cover 20 can be a cylindrical body with inclined surface means in the form of a thread provided at the periphery 23 thereof. The cover then can threadably engage the body 8. A sealing ring 24 provides a high dielectric insulation between the cover 20 and the insulation 2.

The body 8 of casting resin serves at the same time as a support insulator to support the bus-bars. By means of the inserts 25 cast into body 8, the body 8 can be attached to a wall (not shown) of the metal-clad, high-voltage switching gear cabinet.

In the illustrated embodiment, the screw 11 provides for the contact pressure required for the transfer of the current from conductor 1 to branch conductor 7. It is, however, also possible to use the cover 20 to press the plate 10 to the conductor 1, so that the connection can be simplified even further.

What is claimed is:

1. An insulated bus-bar assembly for a high-voltage switching installation comprising a conductor member including a bus-bar conductor of rectangular cross-section having wide and narrow sides, and a layer of insulating material enclosing said conductor, said layer having two mutually aligned openings formed therein down to respective ones of said wide sides of said conductor; a branch conductor extending into one of said openings and pressing tightly against said bus-bar conductor in butt-like fashion; fastening means extending into at least the other one of said openings for tightly holding said branch conductor to the bus-bar conductor; a body of insulating material containing said branch conductor therein and at least partially surrounding said conductor member to close cover said one opening and to define an access opening in said body at said other opening whereby said other opening is accessible from without said body; and a removable cover of insulating material tightly engaging said body at said access opening to close cover said other one of said openings after said fastening means is installed.

2. The insulated bus-bar assembly of claim 1, said openings being circular openings in said insulating layer.

3. The insulated bus-bar assembly of claim 1, said fastening means comprising a screw pressing against said bus-bar conductor and threadably engaging said branch conductor to tightly hold said branch conductor to said conductor member.

4. The insulated bus-bar assembly of claim 1, comprising a seal made of rubber elastic material pressed between said layer of said conductor member and said cover to provide a high dielectric insulation between said layer and said cover.

5. The insulated bus-bar assembly of claim 1, said cover having inclined surface means formed thereon for engaging said body; and said body having holding means formed thereon for receiving said surface means to hold said cover securely in place over said other opening.

6. The insulated bus-bar assembly of claim 5, said cover having a peripheal side wall, said inclined surface means comprising at least one wedge-shaped projection formed on said side wall, and said body having a wall defining said access opening, said holding means comprising a recess formed in said wall of said body to accommodate said wedge-shaped projection whereby said cover can be pressed into place over said other opening.

7. The insulated bus-bar assembly of claim 5, said cover being a cylindrical body having a cylindrical side wall, said inclined surface means being a thread formed on said side wall, and said body having a wall defining said access opening, said holding means being a thread formed on said wall of said body threadably engaging the thread of said cover.

8. The insulated bus-bar assembly of claim 1, comprising a seal made of rubber elastic material pressed between said layer of said conductor member and said body containing said branch conductor to provide a high dielectric insulation between said layer and said body.

9. The insulated bus-bar assembly of claim 8, comprising a second seal of rubber elastic material pressed between said body and said cover to provide a high dielectric insulation between said layer and said body.

10. The insulated bus-bar assembly of claim 1, said fastening means comprising a plate disposed in said other one of said openings and pressed against said bus-bar conductor by said cover to hold said bus-bar conductor against said branch conductor.

11. The insulated bus-bar assembly of claim 1, said body having mounting means formed thereon for mounting said body on a wall of the switching installation whereby said body supports said conductor member.

12. The insulated bus-bar assembly of claim 11, said body being a casting of resin, said mounting means being inserts cast into said body.

* * * * *